June 27, 1967 T. E. BAN 3,328,180
METHOD OF MAKING LIGHT-WEIGHT AGGREGATE FROM FLY ASH
Filed June 24, 1964 3 Sheets-Sheet 1

INVENTOR.
THOMAS E. BAN
BY
ATTORNEYS

June 27, 1967  T. E. BAN  3,328,180
METHOD OF MAKING LIGHT-WEIGHT AGGREGATE FROM FLY ASH
Filed June 24, 1964  3 Sheets-Sheet 3

INVENTOR.
THOMAS E. BAN
BY
ATTORNEYS

United States Patent Office 3,328,180
Patented June 27, 1967

3,328,180
METHOD OF MAKING LIGHT-WEIGHT
AGGREGATE FROM FLY ASH
Thomas E. Ban, Cleveland, Ohio, assignor to McDowell-Wellman Engineering Company, a corporation of Ohio
Filed June 24, 1964, Ser. No. 377,758
8 Claims. (Cl. 106—41)

The present invention relates, as indicated, to an improved process for making useful products from a material which is normally regarded as a useless troublesome by-product, and more particularly to an improved process for producing a light-weight aggregate material having greater non-staining qualities, for use in concrete mixes, cinder blocks, etc.

Fly ash is the air entrained ash residue from power plant boilers that ordinarily use pulverized coal as a fuel source. Fly ash usually occurs as a very fine powder, and amounts to about 10% by weight of the coal which is burned. Typical fly ash compositions show an analysis within the following ranges:

|  | Percent |
| --- | --- |
| Carbon (residual) | 0.1–16.0 |
| Silica | 37.0–60.0 |
| Alumina | 15.0–30.0 |
| Iron oxides | 5.0–20.0 |
| Sulphur | 0.0–3.0 |
| Basic oxides | 3.0–9.0 |

Specific fly ash compositions vary from coal to coal and from locality to locality and, of course, with burning conditions. For example, fly ashes initially containing as much as 30% carbon have been used in this process. As indicated above, fly ash is usually a troublesome waste product having no particular value and presenting serious disposal problems. When burning pulverized coal, air-entrained minute particles of unburned material, ash, are swept out with the flue gases with smoke. Air pollution codes prohibit contamination of the air, and consequently power companies are compelled to use dust arresting means, for example, cyclone dust collectros and electrostatic precipitators. A plant burning 10,000 tons of pulverized coal per day has a disposal problem involving 1,000 tons per day of fly ash. In general it costs up to as much as $1.25 per ton to dispose of this material. Conventional means for disposing of fly ash include dumping the material into old mines or into the ocean, or transporting it and depositing the material in allocated areas where it is tamped and buried with an overlying layer of earth or other material.

The material known as "light-weight aggregate" is ordinarily made from shale, clay and slate materials by a process which produces an expanded or bloated product. These materials have about the same chemical composition as a "light-weight aggregate" material made in accordance with the present invention. Such aggregates are also made from cinders or clinkered ashes from a chain grate stoker. The process of converting these materials to the useful aggregate involves an indurating process whereby the ash is heated to a high temperature to make it into a light-weight agglomerated form which is stable to weathering and mechanical stresses. This conversion is achieved by burning the material with a fuel. A particular advantage of fly ash is that because of the relatively high percentage of residual carbon in the ash, the fuel component is already present. However, as indicated above, because of the extremely small particle size, fly ash is very difficult to handle.

Physically, fly ash is a dry powder, 70% to 85% of it having particle size less than 325 mesh, and particles shaped as rounded materials and of vitrified nature. This material does not wet readily, and accordingly cannot be pelletized or formed into "green balls" or moist, unfired pellets or balls as readily as ground natural minerals. Fly ash does not respond favorably to conventional sintering processes.

It is now been found that fly ash may be formed into hard indurated pellets which may be crushed, or used without crushing, to provide a particularly satisfactory material useful as a "light-weight aggregate." This conversion is effected in an economical, high capacity processing system involving the preparation of green balls that are handled with material handling equipment designed to minimize degradation of green balls. In order to be useful as a light-weight aggregate material, fly ash must be bonded or agglomerated to coarser particle size by partial fusion to form a strong, light-weight material resistant to decomposition by weathering and possessing sufficient compression strength for use as a component in concrete-aggregates.

Fly ash which may be moisture free or contain some moisture, e.g. 10%–15% by weight, is preconditioned with water to provide a homogeneous blend of material that can be satisfactorily balled in commercial sizes of balling equipment. Balling can be performed in accordance herewith without the use of extraneous binder additions. Discrete, carefully sized "green pellets" of fly ash are continuously charged as a thin 5 to 12 inch layer to a travelling grate machine, for example, a "Dwight-Lloyd" traveling grate machine manufactured by the McDowell-Wellman Engineering Company where they are continuously dried by a draft of hot gases drawn through the bed. The dried fly ash pellets are fired or ignited with a series of combustion torches, and indurated under the influence of a gas draft passed through the bed preferably downward. While it is ordinarily desired to produce, heat hardened discrete porous pellets, the intensity of the firing zone can be so adjusted as to produce clinkered masses. While the product may be permitted to cool spontaneously, it may be desirable to cool the product by a continual draft near the discharge end of the machine. This draft may be either up-draft or down-draft.

The fly ash material used in forming the green pellets shall contain free carbon to the extent of from about 5% to 10% bp weight. Means are provided for adjusting the content of carbon in the fly ash to be within this range, when necessary, so that satisfactory discrete pellets or clinkered masses may be formed.

Green pellets shall contain at least about 2% by weight of iron calculated as a metal and usually present as magnetic iron oxide. Means may be provided for adjusting the iron content in the same manner as the carbon content.

Fly ash pellets produced by this system have an outside shell of oxidized reddish-like material and an inner core that is of a blackened cellular-semi-bloated texture that contains lower oxides of iron and perhaps metallic iron along with small amounts of carbon. When fly ash pellets are crushed and screened to provide a graded aggregate, the interior is exposed and this interior provides a surface that contributes to staining problems, e.g., surface exposure of reduced iron that is highly susceptible to staining from weathering action. Through re-treatment of the crushed and graded light-weight aggregate a very beneficial product is made that possesses the original graded structure, yet has completely oxidized surfaces that do not exhibit the undesirable property of staining. Also, re-treatment influences re-bloating of the material and thus causes a lighter weight product to be formed.

Though two separate processes are illustrated for this operation, it should be understood that it is possible to perform both processes simultaneously through layering of the segregated charges, or through co-mixing of materials. The process for reburning and rebloating the graded light-weight aggregates involves a simple ignition of approximately 1000° F. to 2000° F. from 30 seconds to 1 minute followed by a completion of the traverse through the bed of the firing wave front in a period of time on the order of an additional 1 to 1½ minutes. The draft rate of approximately 150 (standard cubic feet per minute) is sufficient for these purposes.

To the accomplishment of the foregoing related ends, then, said invention consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Figure 1:
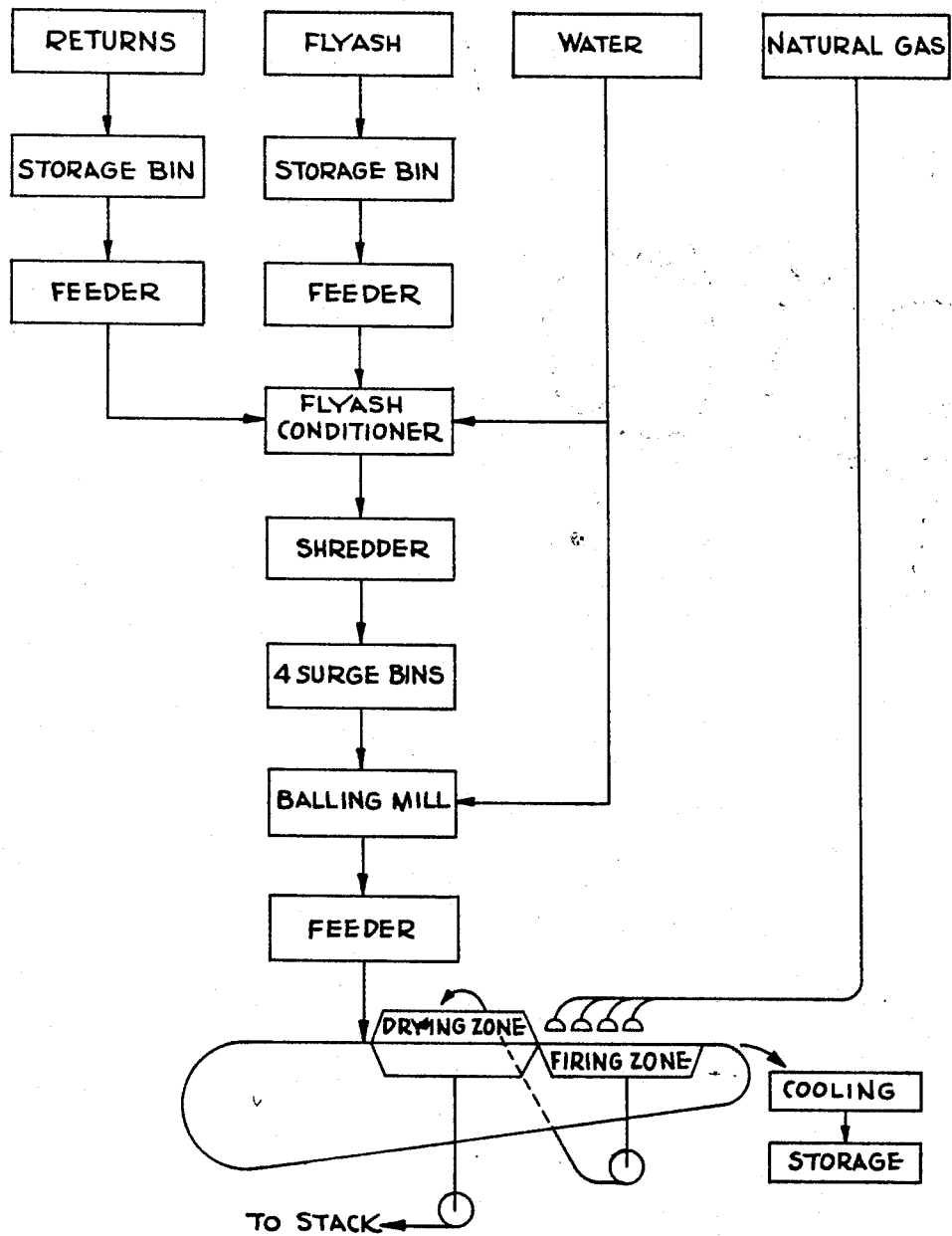
FIG. 1 shows in diagrammatic form, an illustrative flow sheet for producing a material formed from fly ash which is suitable for use in the production of concrete aggregates in accordance with this invention.

Briefly stated, the present invention relates to an improved method for making bloated light-weight aggregate with minimum staining qualities from fly ash products which have a staining index which is higher than that normally acceptable for light-weight aggregate and which may have bulk densities that are higher than normally accepted for light-weight aggregate. Such heat hardened or indurated masses of fly ash are first produced in a process from a fly ash composition which contains from about 5% to about 10% by weight of free carbon and at least about 2% iron calculated as the metal, and which comprises the following steps:

First there are formed discrete "green" pellets of said ash. These pellets are dried by passing gases at a temperature from 550° F. to 900° F. through a bed of said green pellets to remove the free water therefrom without substantially destroying the pellets. Thereafter, free carbon in said dried pellets is brought to a reactive composition with the mineral oxygen or gaseous oxygen by a process which is conveniently termed "ignition"; for example, by passing a bed of the dry pellets beneath gas-burning torches. The firing of said pellets is continued at a temperature which reaches a maximum of from about 1800° F. to about 2400° F. to produce an indurated mass. Thereafter, the mass is cooled, either spontaneously or by forced air draft cooling. According to this process by selecting temperatures within the above-stated firing temperature range, either discrete pellets or a clinker mass may be produced.

In accordance with the present invention this fly ash product either in the form of discrete pellets or as a clinker mass is then crushed and reprocessed. The masses are placed on traveling grates and exposed to a temperature of approximately 1000° F. to about 2000° F. and fired for a period of time. The mass is then cooled and taken from the grate.

Referring now more particularly to the annexed drawings, the fly ash is received from a source, e.g. covered trucks or railroad cars, or by conveyors from an adjacent power plant, etc. and in either a dry or a pre-moistened condition. Pre-moistened fly ask as received may contain up to 20% water. Raw fly ash is delivered to a suitable storage receptacle or bin. From storage, the ash is fed by any suitable conventional feeder, e.g. a table feeder, to a conditioning apparatus where it is prepared for balling or forming into discrete green pellets. In this phase, composition adjustments are made in the water content and, if necessary, in the free carbon content and if desired in the iron content. Adjustment on the water content is made to aid in the balling operation. Adjustment in the free carbon content is made to control the firing characteristics as hereinafter described. Iron is usually found to be present in practical quantities although it may be desirable to remove magnetic components, e.g. $Fe_3O_4$. In certain instances it may be found advantageous to add iron from an economical source of iron oxide, e.g. mill scale. Borax, sodium silicate, fluorspar, lime and other additive materials affecting the nature of the final product may be introduced at this stage, or in a re-rolling stage as later described, the amount being generally less than about 1% and dictated by economic considerations.

It has been found that additional binders are not necessary when the fly ash charge contains from about 5% to about 10% by weight of free carbon on the dry basis and at least about 2% by weight of iron calculated as the metal. Carbon-rich ashes, i.e. those containing upwards of 10% of free carbon may be diluted with carbon free materials, e.g. slate, shale, etc.; and carbon-poor ashes, i.e. those containing less than about 5% weight of carbon may be enriched by adding free carbon as powdered coal or graphite or by a physical means of separation, e.g. floation or classification. Unless the free carbon content of the fly ash charged to the drying and indurating phases later described is between about 5% and 10% of free carbon, the indurated product is likely to be made satisfactory only with processing difficulty. A charged fly ash pellet containing less than about 5% by weight of free carbon lacks sufficient strength for easy processing and insufficient final crushing strength for the indurated product and poor properties as a "light-weight aggregate" material. Pellets which contain too much free carbon, i.e. above about 10% and up to 30% carbon by weight on the dry basis, tend to fuse too easily in processing causing process problems and manufacturing a product only with difficulty.

After the composition of the ash on the dry basis is adjusted with respect to carbon and iron contents, if required, and such addition agents as desired are included, water, is added to the fly ash to bring the moisture content to a level sufficient to permit balls or "green pellets" to be formed in a suitable pelletizing machine, e.g. a drum or inclined rotating pan. In such apparatus the ball size is determined by the moisture content, speed of rotation, and angle of inclination, and it is possible to control ball size by adding moisture as a spray during the balling operation. Thus in the pre-moisturizing phase only that amount of water sufficient to permit balling at a minimum size is added. This is usually from .5% to 2.5% less than the final moisture content of the "green pellets." Final moisture content will vary with different ashes, but will usually be in the range of from 20% to 28% by weight of water.

Pre-moisturizing water addition, as well as other composition adjustments, is conveniently made in a pug-mill of conventional design wherein from about 10% to about 27% by weight of water is added. The amount of water addition will depend on the balling characteristics of the particular ash and the specific balling moisture content thereof, and the initial moisture content. The mass issuing from the pug-mill should be a grandular mass containing from about 20% to about 27% water. Water is added by spray nozzles located over the pug-mill.

This pre-moistening step is important to the balling operation since at the lower pre-moistened level of water content, a range of control over the ultimate pellet size is given to the operator. Thus, it is preferable to put less water than the green pellets or balls ultimately contain in order to provide a means for controlling the ultimate particle size of the pellets. These usually range from ⅛" to as large as ¾" in diameter on the average.

From the pre-moisturizing step, the mass is conveyed by any suitable means such as a belt conveyor to a pelletizing apparatus, preferably through a final homogenizing means such as a shredder designed and positioned for coaction with a conveyor belt. Shredders of this type usually consists of lawn mower or ribbon type reels or blades rotating at high speeds closely adjacent the belt and serving to disintegrate congealed lumps of raw material (moist fly ash), blend the mass, and impart a "fluffy" character or texture to the mass. The shredding step is optional and more than one such operation may be used if desired.

The conveyor with its burden leads next to a balling device such as an inclined pan having a plurality of troughs formed in the rim thereof and of conventional structure, or a balling drum also of conventional structure. Preferably there is used an inclined pan with troughed rim, and in some instances (as where it is desired to add carbon fuel or other additives) including a re-roll ring. Water may be added during the balling step to control the balling operation and to regulate the particle size of the pellets. Generally, from about 0.5% to about 2.5% water is added during the balling operation so that the green balls leaving the balling pan have a higher water content than the premoistened material charged to the balling device. Thus, for a specific fly ash, a premoistened material to be fed to the balling disc or pan desirably contains 21.5% to 25.5% water, and the green balls or pellets issuing therefrom desirably contain 24.5% to 26.5% water. Pellet size within the range of minus ½″ plus 4 mesh was easily maintained.

Figure 2:
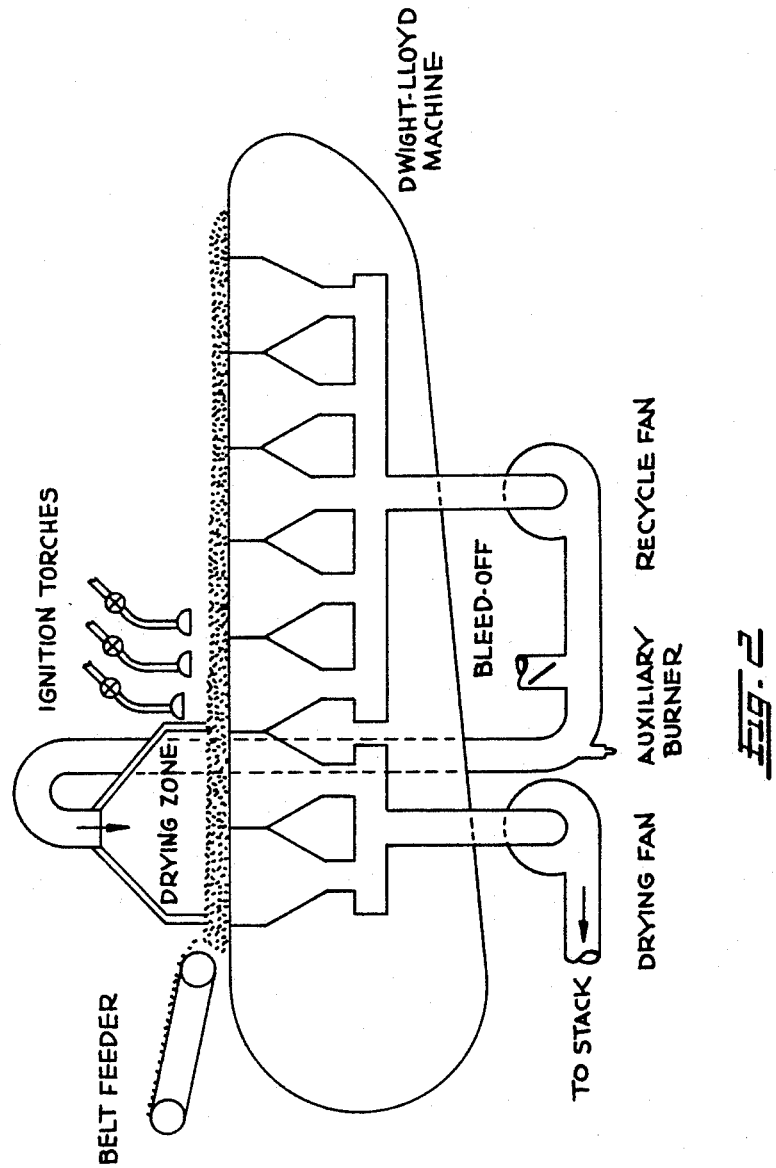
FIG. 2 is a diagrammatic illustration of a traveling grate machine equipped for the present process.
Figure 3:
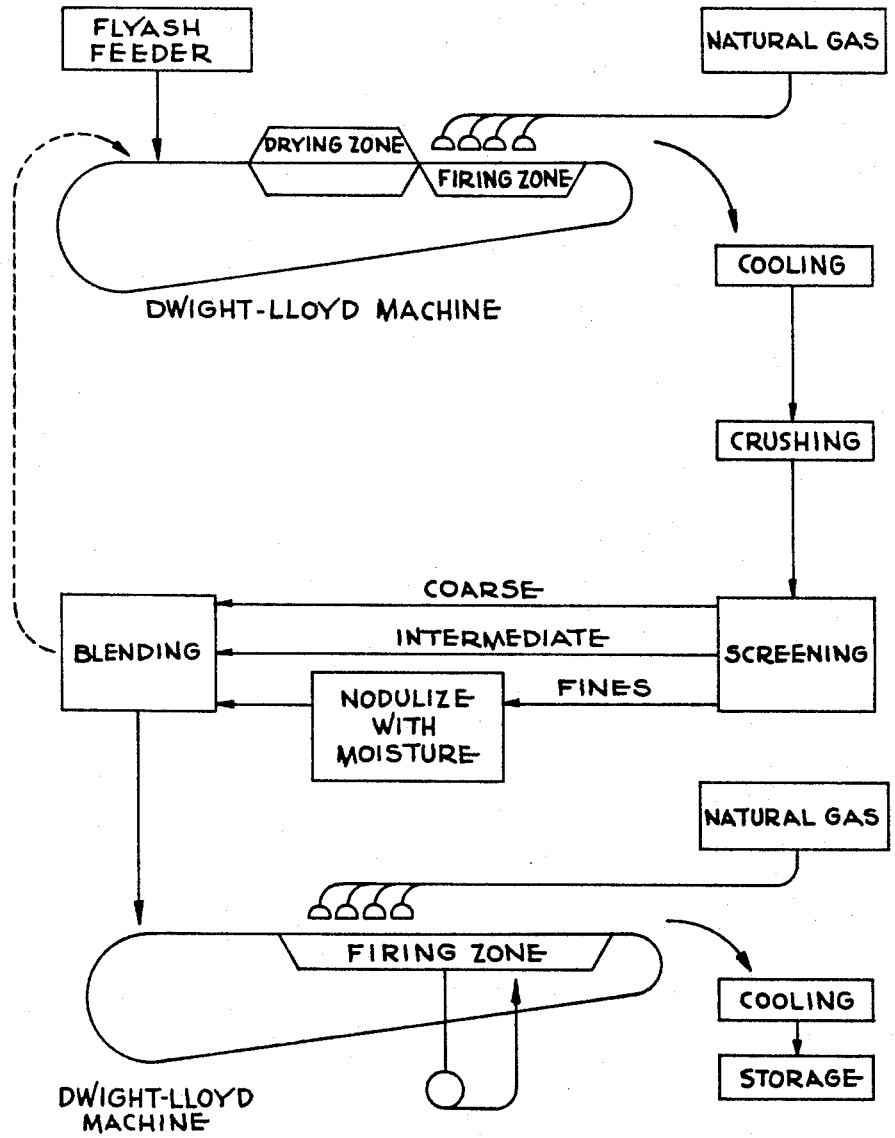
FIG. 3 is a diagrammatic illustration of the improved method of this invention for producing the non-staining light-weight aggregate from fly ash.

From the balling operation the green pellets are conveyed to a traveling grate machine, for example, a "Dwight-Lloyd" traveling grate machine manufactured by the McDowell-Wellman Engineering Company, such as diagrammatically shown in FIG. 2. Such machine are well known in the art, and generally comprises the plurality of individual grate bottom pallets supported on wheels running along an elongated trackway having pallet return means, and having the appearance of an endless belt passing around a driving pulley at one end and a belt return pulley at the other. The pallets are caused to pass between hoods above, and windboxes below, so that gases may be passed through a burden of material supported on the grate bars in the bottom of each pallet. The passage of gas through the burden may be regulated at stages along the path of travel to adjust the temperature and direction of flow of the gas through the charge.

The traveling grate machine is adjusted to provide at least two distinct zones of heat treatment for the green balls. In the first of these, the burden of green pellets is subjected to gases at 550° F. to 950° F. whereby the temperature of the pellets at the top of the bed is raised to no more than about 650° F. and at the bottom, no more than about 250° F. and the free water is driven out. Under these conditions, the rate of heating and water removal is optimum to prevent explosion of the "green pellets" and disintegration into dust. At the same time, the temperature to which the pellets are raised is such that on firing in the next zone, ignition of the fuel content and a condition of incipient fusion of the mass defining a pellet is quickly effected so that when the adhesive force of the remaining film of water is overcome at the very high temperatures, sufficient fusion has occurred to cement the pellet into a strong discrete particle. The preheating or drying in this first zone is effected with the exhaust gases from the firing zone. If desired, cooling air may be bled into the gases issuing from the firing zone to regulate the temperature to secure optimum drying conditions for a given fly ash, a given particle size, a given retention time in the drying zone, a given burden depth, and a given green ball moisture content. Although it is preferable that the hot "recycle" gases move downwardly through the burden, the direction of gas flow may be upwardly or a combination of upward and downward flow through the burden in adjacent sub-zones of the drying zone.

When preheating is not employed, the quantity of "fines" or process generated fines, i.e., particles of size smaller than the desired pellet size, is greatly increased. This is attributed to the tendencies of wet green pellets to spall or explosively disintegrate when subjected to the hot ignition flame. Without drying before ignition of fuel containing pellets, expulsion of the free water (approximately 26.5%) in the pellets is so rapid that the pellets cannot relieve internally formed steam through the pores as rapidly as it is produced. Buildup of internal steam pressure causes disintegration.

About 20% to 45% of the area of the traveling grate machine is utilized in effecting the removal of free water. The total time of retention in the drying zone for a 4″ to 10″ deep bed varies from 1.5 minutes to about 8 minutes, and the gas flow rate may range from about 200 to about 325 standard cubic feet per minute per square foot (s.c.f.m./ft.$^2$) at a gas temperature of from 550° F. to 950° F. In general, most favorable results are obtained with a drying time of about 4 minutes and utilizing 40% of the traveling grate machine for drying, and 6″ bed depth.

As indicated above, the dried pellets leave the drying zone and enter a firing zone. The fore part of this zone includes a plurality of gas torches conveniently downwardly directed toward the burden which is moved beneath the torches. Hot gases are preferably downwardly directed through the burden. The firing temperature reaches from 1800° F. to 2200° F. to form discrete pellets and up to 2400° F. to form clinker. Thus, to form clinker, temperatures of from about 2200° F. to about 2400° F. are employed. The amount of exposure to intense heating from the torches ranges from 20 to about 300 seconds. This is sufficient to initiate reaction of the carbon fuel in the burden and on continued passage of a draft through the burden for from 5 to 6 minutes at 100 to 200 s.c.f.m./ft.$^2$ including the ignition time, a satisfactory product is obtained. Total retention in the indurating zone ranges from about 4 to about 14 minutes. The crushing strength of pellets produced by this process with fly ash containing 6.57% carbon is in the range of about 80 to 110 lbs. The crushing strength of the wet green balls or pellets is on the order of 0.5 to 1.0 lb.

As indicated in FIG. 1, smaller particles recovered during the process as "fines" are "returns" and are reprocessed.

While the mechanism of induration of the fuel containing fly ash is not shown, the cooled product shows signs of having undergone a blowing or bloating effect whereby the product derives a marked porous internal structure. Fuel contained in the pelletized ash burden burns or reacts with metallic oxides to form gaseous oxide of carbon, i.e., carbon monoxide or carbon dioxide. Bloating may occur also from gases evolved in thermal decomposition of expulsion of these gases from the pellet results in the formation of a porous structure. A reaction between the carbon and iron oxide contained in the ash may result in the formation of gases, e.g., carbon monoxide which contributes to pore formation as well as the formation of a pellet binding amount of metallic iron. Free sulphur may also contribute to the pore-forming effect noticed in the firing and indurating stage.

The fired pellets may be discharged hot from the end of the traveling grate machine or optionally and desirably passed through a cooling zone provided on the traveling grate machine before discharge therefrom, e.g., as shown in FIG. 2. The ignition zone including the firing zone is preferably about 1.3 to 2.0 times the length of the drying zone, and the cooling zone, if used, of a length about equal to that of the drying zone.

The amount of heat introduced through the gas torches ranges from about $0.6 \times 10^6$ to about $4.5 \times 10^6$ B.t.u./ton, and economy of operation is effected by using the exhaust gases from the indurating and firing zone as the heat source for the drying zone.

A specific electrostatically precipitated fly ash material contained 6.92% free carbon and about 11.4% $Fe_2O_3$, and about 13.0% water as received, and resulted from burning a powdered Eastern United States bituminous coal. This fly ash is conditioned with water to provide a uniform blend of feed containing about 24% water before balling. "Green pellets" in a size range of minus ½″ plus 4 mesh are formed on an inclined pan balling or pelletizing apparatus and further moisturized during balling to a moisture content of 26%. The pan, inclined at an angle of 54° to the horizontal, is 7.5 feet in diameter, and rotated at 20 r.p.m. The pellets, which may desirably be screened at this point, are charged to a traveling grate machine to a bed depth of 6″. "Green pellets" are dried with recycle gases from the firing zone for a period of 4 minutes at a draft temperature of 820° F. using downdraft at a flow rate of 290 s.c.f.m./ft.$^2$. Feed rate to the machine is about 2880 lbs./hour of "green pellets," and the speed of the traveling grate machine is conveniently 12.5 inches/minute. Ignition is effected by introduction of $2.33 \times 10^6$ B.t.u./ton through 1 gas torch and a down-draft rate of 168 s.c.f.m./ft.$^2$. The firing cycle including ignition for 40 seconds totals 6.4 minutes at an average down-draft flow rate of 147 s.c.f.m./ft.$^2$. By increasing the intensity of ignition, a clinker product can be produced instead of discrete pellets. An ignition intensity of about 175% of that indicated above, i.e., 3 torches and $4.2 \times 10^6$ B.t.u. produces a clinkered product.

As indicative above, the composition of the ash may be altered if desirable to include various addition agents to confer desired processing or final properties. A principal composition adjustment is that of adjusting the fuel content of free carbon in the ash to from 5% to 10% by weight. This adjustment may be made conveniently with the pre-moisturizing step.

Adhesives, such as montmorillonite clay, may be added if desired. However, it has been found that with fly ashes containing from 5% to 10% carbon and the indicated amount of iron that this is not necessary. Below 5% carbon, difficulty is experienced in firing the balls and unduly high percentages of "fines" and poor quality products are produced. From 0.05% to 3% of clay may be used.

Silica may be added if desired as a means for adjusting the firing characteristic of the fly ash. From 5% to 35% silica may thus be added although with high percentages it becomes necessary to use a balling aid, such as bentonite.

Shale, slate and clay may also be added as a diluent, if desired, all materials being useful in producing a "light-weight aggregate" material. From 5% to 60% of such material may be added, particularly with high carbon ashes, e.g., from 10% to 16% free carbon.

The resulting product produced in this process is then crushed and classified in any suitable devices of conventional design to produce a product of value in concrete aggregate compositions as a light-weight component. The product is an indurated fly ash material which is water and weather resistant, and which has a low bulk density of from about 45 to about 49 lbs. per cubic foot.

However, as previously indicated, when the fly ash pellets or clinkers are crushed and screened to provide a graded aggregate, the interior is exposed and this interior provides a surface that contributes to staining problems, e.g., surface exposure of reduced iron that is highly susceptible to staining from weathering action. It is important to further oxidize this reduced iron to minimize or substantially eliminate the staining action caused by oxidation or hydration of such iron. This is accomplished by retreating the crushed fly ash pellets or clinkers, on a traveling grate machine. A very beneficial product that possesses the original grade of structure, yet has completely oxidized surfaces that do not contribute to staining is produced. Also, the re-treatment by this process effects to some desirable degree a re-bloating of the material which causes a lighter-weight product to be formed.

Though two separate traveling grate processes are illustrated for this operation, it is possible to perform both simultaneously through layering of the segregated charges or through co-mixing of the materials.

The crushed fly ash material is placed on the traveling grates of another machine similar to the one used to produce the pellets or clinkers. The graded aggregates can be prepared by one of the following three methods. The first is by nodulizing with moisture the completely crushed and graded burden prior by placing on the grate. Secondly by treating only the coarser size materials, e.g., the plus $\frac{1}{16}$ inch diameter grades, and thirdly by segregating the grades, nodulizing the minus $\frac{1}{16}$ inch diameter fines and then reblending the nodulized fines with the plus $\frac{1}{16}$ inch diameter grades before placing the material on the traveling grates. The process for reburning and rebloating the light-weight aggregates involves a simple ignition of approximately 1000° F. to about 2000° F. from 30 seconds to 1 minute followed by completion firing and cooling wave of an additional 1 to 1½ minutes. The draft rate of approximately 150 s.c.f.m. is sufficient for these purposes.

Thus, a highly improved light-weight aggregate is formed from fly ash. The staining properties have been reduced and substantially eliminated and the material rebloated to form a lighter weight aggregate than that originally produced by the method for making such aggregate disclosed in application Serial No. 256,738, now abandoned, on which I am a joint inventor with Charles D. Thompson and Donald C. Violetta.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A process for producing an indurated product from fly ash which contains from about 5% to about 10% by weight of free carbon and at least about 2% by weight of iron calculated as the metal which comprises the steps of:
   (a) forming discrete green pellets of said ash;
   (b) drying said pellets by passing gases of a temperature of from 550° F. to 900° F. through a bed of said pellets to remove the free water therefrom without substantially destroying said pellets;
   (c) firing said pellets at a temperature of from about 1800° F. to about 2400° F. to initiate reaction of the carbon in said pellets to yield gaseous carbon oxides, and to produce an indurated product;
   (d) cooling said product;
   (e) crushing the product;
   (f) re-firing the crushed product at a temperature of from about 1000° F. to about 2000° F.; and
   (g) cooling the re-fired crushed product.

2. A process for producing an indurated product from fly ash which contains from about 5% to about 10% by weight of free carbon and at least about 2% by weight of iron calculated as the metal which comprises the steps of:
   (a) forming discrete green pellets of said ash;
   (b) drying said pellets by passing gases of a temperature of from 550° F. to 900° F. through a bed of said pellets to remove the free water therefrom without substantially destroying said pellets;
   (c) firing said pellets at a temperature of from about 1800° F. to about 2400° F. to initiate reaction of the carbon in said pellets to yield gaseous carbon oxides, and to produce an indurated product;
   (d) cooling said product;
   (e) crushing the product;
   (f) screening and grading the product;
   (g) nodularizing with moisture the graded product;
   (h) re-firing the nodularized, graded product at a temperature of from about 1000° F. to about 2000° F.; and
   (i) cooling the re-fired product.

3. A process for producing an indurated product from fly ash which contains from about 5% to about 10% by weight of free carbon and at least about 2% by weight of iron calculated as the metal which comprises the steps of:

(a) forming discrete green pellets of said ash;
(b) drying said pellets by passing gases of a temperature of from 550° F. to 900° F. through a bed of said pellets to remove the free water therefrom without substantially destroying said pellets;
(c) firing said pellets at a temperature of from about 1800° F. to about 2400° F. to initiate reaction of the carbon in said pellets to yield gaseous carbon oxides, and to produce an indurated product;
(d) cooling said product;
(e) crushing the product;
(f) screening and grading the crushed product to separate particles having a plus 1/16 inch diameter;
(g) re-firing the graded product having a plus 1/16 inch diameter at a temperature from about 1000° F. to about 2000° F.; and
(h) cooling the re-fired product.

4. A process for producing an indurated product from fly ash which contains from about 5% to about 10% by weight of free carbon and at least about 2% by weight of iron calculated as the metal which comprises the steps of:
(a) forming discrete green pellets of said ash;
(b) drying said pellets by passing gases of a temperature of from 550° F. to 900° F. through a bed of said pellets to remove the free water therefrom without substantially destroying said pellets;
(c) firing said pellets at a temperature of from about 1800° F. to about 2400° F. to initiate reaction of the carbon in said pellets to yield gaseous carbon oxides, and to produce an indurated product;
(d) cooling said product;
(e) crushing the product;
(f) screening and grading the crushed product to separate particles having a minus 1/16 inch diameter;
(g) nodularizing with moisture the particles having the minus 1/16 inch diameter;
(h) re-blending the nodularized particles with the separated particles;
(i) re-firing the re-blended particles at a temperature of from about 1000° F. to about 2000° F.; and
(j) cooling the re-fired particles.

5. A process for producing clinkers of an indurated product from fly ash which contains from about 5% to about 10% by weight of free carbon and at least about 2% by weight of iron calculated as the metal which comprises the steps of:
(a) forming discrete green pellets of said ash;
(b) drying said pellets by passing gases at a temperature of from 550° F. to 900° F. through a bed of said pellets to remove the free water therefrom without substantially destroying said pellets;
(c) firing said pellets at a temperature of from about 2200° F. to about 2400° F. to initiate reaction of the carbon in said pellets to yield gaseous carbon oxides, and to produce clinker of indurated product;
(d) cooling the clinker;
(e) crushing the clinker;
(f) re-firing the crushed clinker at a temperature of from about 1000° F. to about 2000° F.; and
(g) cooling the re-fired crushed clinker.

6. A process for producing clinkers of an indurated product from fly ash which contains from about 5% to about 10% by weight of free carbon and at least about 2% by weight of iron calculated as the metal which comprises the steps of:
(a) forming discrete green pellets of said ash;
(b) drying said pellets by passing gases at a temperature of from 550° F. to 900° F. through a bed of said pellets to remove the free water therefrom without substantially destroying said pellets;
(c) firing said pellets at a temperature of from about 2200° F. to about 2400° F. to initiate reaction of the carbon in said pellets to yield gaseous carbon oxides, and to produce clinker of indurated product;
(d) cooling the clinker;
(e) crushing the clinker;
(f) screening and grading the crushed clinker;
(g) nodularizing with moisture the graded clinker;
(h) re-firing the nodularized, graded clinker at a temperature of from about 1000° F. to about 2000° F.; and
(i) cooling the re-fired product.

7. A process for producing clinkers of an indurated product from fly ash which contains from about 5% to about 10% by weight of free carbon and at least about 2% by weight of iron calculated as the metal which comprises the steps of:
(a) forming discrete green pellets of said ash;
(b) drying said pellets by passing gases at a temperature of from 550° F. to 900° F. through a bed of said pellets to remove the free water therefrom without substantially destroying said pellets;
(c) firing said pellets at a temperature of from about 2200° F. to about 2400° F. to initiate reaction of the carbon in said pellets to yield gaseous carbon oxides, and to produce clinker of indurated product;
(d) cooling the clinker;
(e) crushing the clinker;
(f) screening and grading the crushed clinker to separate particles having a plus 1/16 inch diameter;
(g) re-firing the graded clinker having a plus 1/16 inch diameter at a temperature from about 1000° F. to about 2000° F.; and
(h) cooling the re-fired clinker.

8. A process for producing clinkers of an indurated product from fly ash which contains from about 5% to about 10% by weight of free carbon and at least about 2% by weight of iron calculated as the metal which comprises the steps of:
(a) forming discrete green pellets of said ash;
(b) drying said pellets by passing gases at a temperature of from 550° F. to 900° F. through a bed of said pellets to remove the free water therefrom without substantially destroying said pellets;
(c) firing said pellets at a temperature of from about 2200° F. to about 2400° F. to initiate reaction of the carbon in said pellets to yield gaseous carbon oxides, and to produce clinker of indurated product;
(d) cooling the clinker;
(e) crushing the clinker;
(f) screening and grading the crushed clinker to separate particles having a minus 1/16 inch diameter;
(g) nodularizing with moisture the particles having the minus 1/16 inch diameter;
(h) re-blending the nodularized particles with the separated particles;
(i) re-firing the re-blended particles at a temperature of from about 1000° F. to about 2000° F.; and
(j) cooling the re-fired particles.

References Cited

UNITED STATES PATENTS

| | | | |
|---|---|---|---|
| 2,933,796 | 4/1960 | Somogyi | 106—40 |
| 2,946,112 | 7/1960 | Tucker et al. | 106—40 |
| 2,955,947 | 10/1960 | Gmeiner et al. | 264—44 |
| 2,987,411 | 6/1961 | Minnick | 106—40 |

HELEN M. McCARTHY, *Primary Examiner.*

J. POER, *Assistant Examiner.*